(12) United States Patent
Pichumani et al.

(10) Patent No.: US 11,796,819 B1
(45) Date of Patent: Oct. 24, 2023

(54) LIQUID CRYSTAL BASED METASURFACES FOR OPTICAL SYSTEMS, METHODS, AND DEVICES

(71) Applicant: META PLATFORMS, INC., Menlo Park, CA (US)

(72) Inventors: Pradip Sairam Pichumani, Bellevue, WA (US); Sandeep Rekhi, San Jose, CA (US); Thomas John Farrell Wallin, Redmond, WA (US)

(73) Assignee: Meta Platforms, Inc., Menlo Park, CA (US)

( * ) Notice: Subject to any disclaimer, the term of this patent is extended or adjusted under 35 U.S.C. 154(b) by 0 days.

(21) Appl. No.: 17/855,026

(22) Filed: Jun. 30, 2022

(51) Int. Cl.
  *G02B 27/01* (2006.01)
  *G02B 3/08* (2006.01)
  *G02F 1/1343* (2006.01)

(52) U.S. Cl.
  CPC ........... *G02B 27/0172* (2013.01); *G02B 3/08* (2013.01); *G02F 1/134309* (2013.01); *G02B 2027/0138* (2013.01)

(58) Field of Classification Search
  CPC ....... G02F 1/29; G02F 1/294; G02B 27/0101; G02B 27/0172; G02B 27/01; G02B 27/017; G02B 1/002; G02B 6/00; G02B 6/0023
  See application file for complete search history.

(56) References Cited

U.S. PATENT DOCUMENTS

| | | | |
|---|---|---|---|
| 6,437,925 B1 * | 8/2002 | Nishioka | G02B 3/14 359/290 |
| 10,852,619 B1 | 12/2020 | Yaroshchuk et al. | |
| 10,962,855 B2 | 3/2021 | Schowengerdt et al. | |
| 11,061,286 B2 | 7/2021 | Chanda et al. | |
| 2008/0029714 A1* | 2/2008 | Olsen | G02B 7/04 257/E31.127 |
| 2016/0282639 A1* | 9/2016 | von und zu Liechtenstein | G01J 4/00 |
| 2020/0393736 A1* | 12/2020 | Hu | G02B 6/0011 |
| 2021/0181515 A1 | 6/2021 | Ellenbogen et al. | |

OTHER PUBLICATIONS

Komar, Electrically tunable all-dielectric optical metasurfaces based on liquid crystals; Appl. Phys. Lett. 110, 071109, 2017 (Year: 2017).*

Bosch, Electrically Actuated Varifocal Lens Based on Liquid-Crystal-Embedded Dielectric Metasurfaces; Nano Lett. 21, 3849-3856, 2021 (Year: 2021).*

Chou J., et al., "Electrically Switchable Diffractive Waveplates with Metasurface Aligned Liquid Crystals," Optics Express, Oct. 17, 2016, vol. 24, No. 21, 9 pages.

* cited by examiner

*Primary Examiner* — Yuzhen Shen
(74) *Attorney, Agent, or Firm* — BakerHostetler

(57) ABSTRACT

Systems, methods, and apparatuses may provide optical lenses comprising liquid crystal metasurfaces. Systems and methods may include a lens system comprising a first optical lens and a liquid crystal metasurface formed on the first optical lens, and a pair of electrodes positioned on opposite sides of the first optical lens. The pair of electrodes may individually tune sections of the liquid crystal metasurface to adjust an optical characteristic of the optical signal. A waveguide may be configured to receive the adjusted optical signal passed through the first optical lens and may provide the optical signal to an image sensor for an image.

16 Claims, 15 Drawing Sheets

Lens

Waveguide

Reflector

LIQUID CRYSTAL BASED METASURFACES FOR OPTICAL SYSTEMS, METHODS, AND DEVICES

TECHNOLOGICAL FIELD

Exemplary embodiments of this disclosure relate generally to systems, methods, and apparatuses for optical lenses with a liquid crystal metasurface layer.

BACKGROUND

Conventional camera modules are becoming increasingly difficult to include in computing devices and systems where physical space is limited. Conventional camera modules often require a dedicated space in the design to house larger parts, such as moving lens components, a complementary metal-oxide semiconductor (CMOS) sensor, and integrated circuitry (IC). Some camera designs contain multiple stacks of convex and concave lenses to focus light. Such physical space requirements may be highly detrimental to achieving thin and small form factor designs.

Camera modules with larger and/or movable components may also be prone to generating particles. However, such particles, e.g., dust particles, within the camera module may cause blurry images or unwanted haze in the final picture rendering the camera module unusable. Unintentional drops and vibrations may further cause particle generation from component contact. Accordingly, there is a need for improved and size efficient camera modules.

BRIEF SUMMARY

In meeting the described challenges, the present disclosure provides optical lens systems, computer program products, and image forming methods utilizing liquid crystal metasurfaces. Exemplary embodiments may include a lens system comprising a first optical lens, a liquid crystal metasurface formed on the first optical lens, and a pair of electrodes for the first optical lens, and positioned on opposite sides of the first optical lens. The pair of electrodes may comprise an optical trace, e.g., a metal trace, configured to individually regulate the characteristic and/or functionality of the liquid crystals through the individual electrodes (e.g., tune) sections of the liquid crystal metasurface and adjust an optical characteristic of the optical signal. A waveguide may be configured to receive an optical signal passing through the first optical lens, and a liquid crystal reflector may further direct the optical signal to the waveguide. An image sensor may be configured to receive the optical figure from the waveguide and form an image, e.g., on a display and/or in real-time.

In various exemplary embodiments, the tunable optical characteristics may include at least one of amplitude, phase, or polarization. In exemplary embodiments, the electrodes may tune a plurality of sections individually, and optionally simultaneously. For example, the electrodes may tune five sections of the optical lens, and at least three concentric regions. In some other examples, the electrodes may tune any other suitable number of sections of the optical lens, and any other suitable number of concentric regions. In some exemplary embodiments, the liquid crystal metasurface may be tuned to focus the optical signal within a wavelength range of an image sensor. For example, the wavelength range may correspond to a color range, such as red, green, or blue wavelength ranges. In some exemplary embodiments, lens systems may tune the optical signals based on feedback provided by the image sensor.

Optical lenses in accordance with exemplary embodiments may be a Fresnel lens. Some exemplary lens system embodiments may have a thickness of 10-15 micrometers. The liquid crystal metasurface may be comprised of one or more of diamond, cubic zirconia (CZ), aluminum gallium arsenide (AlGaAs), zinc tellurium (ZnTe), amorphous silicon (a-Si), or silicon carbide (SiC). The pair of electrodes may be formed from at least one of indium tin oxide (ITO), titanium oxide ($TiO_2$), silver tellurium (AgTe), or silver selenium (AgSe).

Exemplary embodiments may comprise a second optical lens positioned between the first optical lens and the waveguide, the second optical lens comprising a second liquid crystal metasurface tunable by a second pair of electrodes positioned on opposite sides of the second optical lens. Optical lenses may have different transparencies. Systems, methods, and devices in accordance with exemplary embodiments herein may include a head-mounted optical device(s), such as gaming devices, augmented reality, virtual reality, and mixed reality devices, and other image forming devices.

In one example embodiment, a device is provided. The device may include a first optical lens and a liquid crystal metasurface formed on the first optical lens. The device may also include a waveguide configured to receive an optical signal passing through the first optical lens. The device may also include a pair of electrodes positioned on opposite sides of the first optical lens. The pair of electrodes may be configured to tune sections of the liquid crystal metasurface and may adjust an optical characteristic of the optical signal. The device may also include a liquid crystal reflector configured to direct the optical signal to the waveguide.

In another example embodiment, a computer program product is provided. The computer program product includes at least one computer-readable storage medium having computer-executable program code instructions stored therein. The computer-executable program code instructions may include program code instructions configured to receive optical signals indicative of a scene via a plurality of lenses providing light to a respective image sensor. The computer program product may further include program code instructions configured to individually tune the plurality of lens based on a wavelength range of the respective image sensor associated with the plurality of lenses. The computer program product may further include program code instructions configured to combine optical signals received at the respective image sensor to generate an image.

In yet another example embodiment, a method is provided. The method may include receiving, at a waveguide, an optical signal passing through a first optical lens and a second optical lens. The first optical lens and the second optical lens may include a liquid crystal metasurface and a pair of electrodes positioned on opposite sides of the first optical lens. The pair of electrodes may be configured to tune sections of the liquid crystal metasurface. The method may further include tuning at least one of the first optical lens or the second optical lens to adjust an optical characteristic of the optical signal. The method may further include providing the optical signal to an image sensor via the waveguide. The method may further include generating an image based on the optical signal received at the image sensor.

Additional advantages will be set forth in part in the description which follows or may be learned by practice. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The summary, as well as the following detailed description, is further understood when read in conjunction with the appended drawings. For the purpose of illustrating the disclosed subject matter, there are shown in the drawings exemplary embodiments of the disclosed subject matter; however, the disclosed subject matter is not limited to the specific methods, compositions, and devices disclosed. In addition, the drawings are not necessarily drawn to scale. In the drawings.

Figure 1:
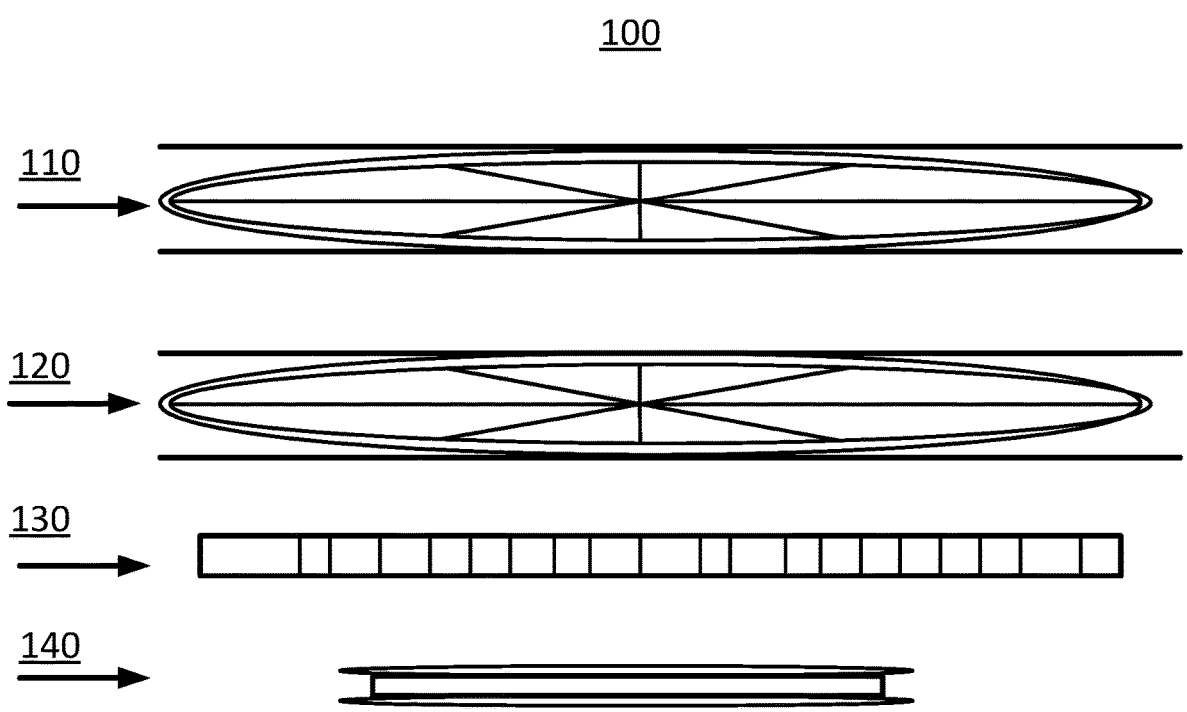
FIG. 1 illustrates a lens system, in accordance with exemplary embodiments of the present disclosure.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The present disclosure may be understood more readily by reference to the following detailed description taken in connection with the accompanying figures and examples, which form a part of this disclosure. It is to be understood that this disclosure is not limited to the specific devices, methods, applications, conditions or parameters described and/or shown herein, and that the terminology used herein is for the purpose of describing particular embodiments by way of example only and is not intended to be limiting of the claimed subject matter.

Also, as used in the specification including the appended claims, the singular forms "a," "an," and "the" include the plural, and reference to a particular numerical value includes at least that particular value, unless the context clearly dictates otherwise. The term "plurality", as used herein, means more than one. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable. It is to be understood that the terminology used herein is for the purpose of describing particular aspects only and is not intended to be limiting.

It is to be appreciated that certain features of the disclosed subject matter which are, for clarity, described herein in the context of separate embodiments, may also be provided in combination in a single embodiment. Conversely, various features of the disclosed subject matter that are, for brevity, described in the context of a single embodiment, may also be provided separately or in any sub-combination. Further, any reference to values stated in ranges includes each and every value within that range. Any documents cited herein are incorporated herein by reference in their entireties for any and all purposes.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

A main challenge in compact optical systems, such as small form factor devices, is providing size-efficient, effective camera modules. The number and size of components and lenses in conventional modules may add a thickness above an image sensor, which may not be ideal for compact designs. Many optical systems and devices, including but not limited to wearable devices, glasses, gaming devices, artificial reality (AR)/virtual reality (VR)/mixed reality (MR) systems, may require compact cameras, and/or an internal camera placement (e.g., inside a glasses frame) to appropriately hide and/or protect the sensitive components from an external environment.

FIG. 1 illustrates an exemplary embodiment, which faces the challenges noted above, and utilizes a lens system 100 comprising a liquid crystal metasurface on optical lenses. Exemplary embodiments may utilize a combination of static and dynamic metasurfaces to form a lens stack. A dynamic metasurface may be achieved by utilizing liquid crystals placed between two electrodes configured to enable the manipulation of the liquid crystal orientation.

The side view of lens system 100 in FIG. 1 provides a first optical lens 110, a second optical lens 120, a waveguide and grating 130, and a reflector 140. As discussed herein, the first and second optical lens 110, 120 may further comprise a liquid crystal metasurface, which may be tunable (e.g., regulated) via a pair of electrodes positioned on opposite sides of the optical lens. The liquid crystal metasurfaces may be configured to tune an optical characteristic of incoming optical signals, e.g., light beams. Optical characteristics may include at least one of a direction, amplitude, phase, or a polarization of optical signals. As discussed herein, and further illustrated in FIG. 2, different sections of the first and second optical lenses may be tuned differently, thus adjusting optical characteristics for incoming optical signals individually, depending on a particular section of the lens in which the incoming optical signals are received. As such, the liquid crystal metasurface may adjust the focus of different wavelengths of light received by a waveguide and directed to an image sensor (e.g., image sensor 250), such as for example a camera image sensor.

In various exemplary embodiments, the lens stack may be patterned directly onto an optical lens, such as an eyewear lens, e.g., on a wearable device, an AR/VR/MR device, a head-mounted device, and/or the like. Light captured by the metasurfaces may be directed onto an image sensor (e.g., image sensor 250), such as a CMOS image sensor, through one or more waveguides and gratings. In some exemplary embodiments, the image sensor may be remote (e.g., housed separately), or placed adjacent or substantially near the lens stack (e.g., within a lens frame).

In some exemplary embodiments, the lens system 100 may comprise a thickness of 10-15 micrometers, thus making the design advantageous for small form factor lens applications, small devices, and/or the like. Such ultra-compact forms may provide the ability to reduce the thickness of eyewear, lenses, frames, and/or other head-mounted devices.

Accordingly, camera modules and optical lens systems may achieve a very small footprint, and may use significantly less space than conventional camera modules, since many large components and moving components within conventional camera modules are replaced by the liquid crystal metasurface layer. Exemplary embodiments discussed herein may further remove components such as physical lenses, which may significantly reduce debris and dust generation within camera modules. A reduction in debris and dust may decrease probabilities of camera failure due to such particles. The optical lens systems and liquid crystal metasurfaces discussed herein may be usable and functional in magnetic environments, and in the presence of strong magnetic fields.

Thus, exemplary embodiments of the present disclosure may be easily adapted for a range of optical devices, including but not limited to a variety of small form factor devices, frames, AR, VR, MR, and pseudo-AR devices, surveillance systems, mobile computing devices, and/or other wearable devices. The exemplary embodiments discussed herein may also be utilized for a range of imaging (e.g., infrared imaging) and sensing applications by manipulating, steering, and shaping optical beams. Accordingly, applications of the present disclosure may include, but are not limited to body tracking, biosensing, and other biomedical engineering applications.

Figure 2:
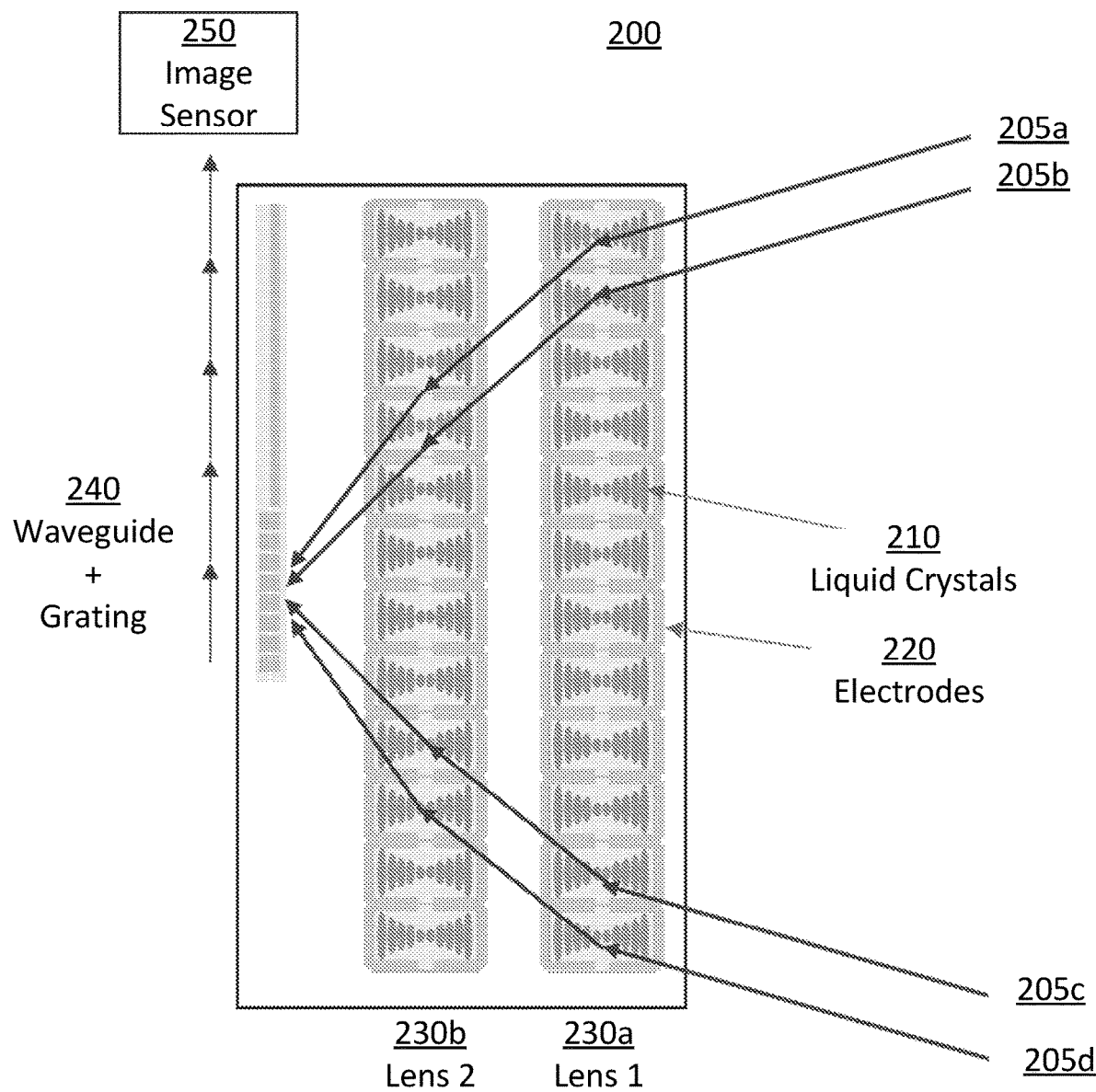
FIG. 2 illustrates an optical diagram corresponding to the lens configuration of FIG. 1, in accordance with exemplary embodiments of the present disclosure.

FIG. 2 illustrates an optical system 200 corresponding to the lens configuration of FIG. 1. The optical diagram 200 illustrates an optical path of light beams 205a, 205b, 205c, 205d passing through a pair of optical lenses 230a, 230b, towards a waveguide and grating element 240, and an image sensor 250. Each optical lens 230a, 230b, includes liquid crystals 210 and a set of electrodes 220 surrounding the surface of each optical lens 230a, 230b. The lens 230a may also be referred to herein as lens 1 and the lens 230b may also be referred to herein as lens 2.

As discussed herein, sections of each optical lens 230a, 230b may be separately tunable, for example, to enable various light paths and optical characteristics. Each optical lens 230a, 230b may have a different transparency, depending on the application and other considerations. A plurality of materials may form each optical lens 230a, 230b, in accordance with exemplary embodiments. For example, indium tin oxide, which has a high transparency compared to other metals, may be patterned to form the electrodes necessary to manipulate the liquid crystal orientation, and separately tune different sections of the optical lens 230a, 230b.

For example, for purposes of illustration and not of limitation, each lens 230a, 230b may have twelve liquid crystal 210 sections as illustrated in FIG. 2. In some other exemplary embodiments, each lens 230a, 230b may have any suitable number of liquid crystal 210 sections. Each liquid crystal section 210 may be separately tunable by electrodes 220. That is, the characteristic and/or functionality of the liquid crystals may be regulated through the individual electrodes. In exemplary embodiments, an optical trace, such as a metal trace, from each electrode may be managed, e.g., manually and/or by a computing device, to tune sections of lens 230a, 230b. As such, each light beam 205a, 205b, 205c, 205d may follow a separate path towards the waveguide and grating 240.

The electrodes 220 on each lens 230a, 230b may also tune i.e., regulate a characteristic and/or functionality of the liquid crystals 210 on each lens 230a, 230b to focus incident light to a region of interest, area, or point, depending on the particular application. For example, the pair of electrodes 220 may tune the liquid crystal metasurface to focus an optical signal within a wavelength range of the image sensor (e.g., image sensor 250). In other exemplary embodiments, the pair of electrodes 220 may simultaneously tune a plurality of sections of the liquid crystal metasurface.

In some examples, light rays and optical input entering the lenses 230a, 230b may be focused to a point on the waveguide and grating 240. The waveguide and grating 240 may receive light passing through each lens 230a, 230b and may direct the optical signals to the image sensor 250.

The image sensor 250 may be a local or remote image sensor, depending on the lens system configuration, purpose, and/or other considerations. In exemplary embodiments, the image sensor 250 may receive input from a plurality of lens systems, as discussed herein, and may combine input to form an image, e.g., on a display, graphical user interface, and/or other device.

Figure 3:
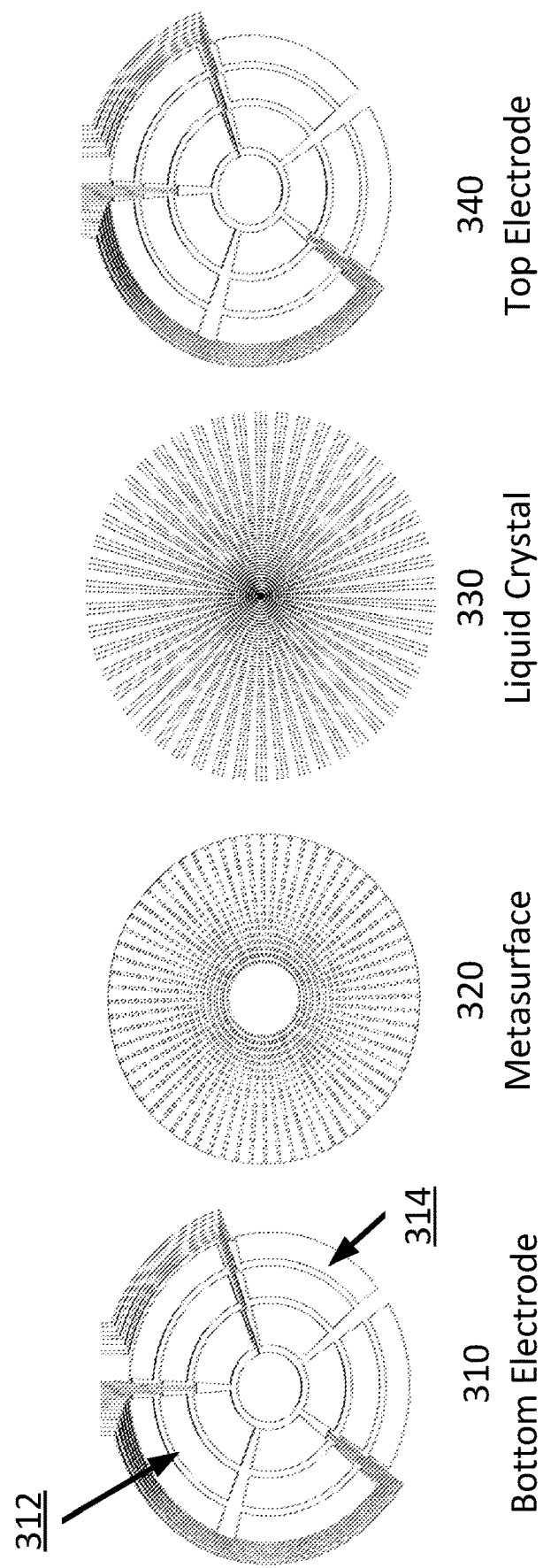
FIG. 3 illustrates optical lens layers, in accordance with exemplary embodiments of the present disclosure.

FIG. 3 illustrates layers of the optical lens, in accordance with exemplary embodiments. An optical lens may include a bottom electrode 310, a metasurface 320, liquid crystals 330, and a top electrode 340. Each element of the optical lens may be stacked, such that bottom electrode 310 is beneath the metasurface 320, the liquid crystals 330 (also referred to herein as liquid crystal layer) are provided on the metasurface 320, and top electrode 340 forms the top of the stack. Although the depicted lenses provide a circular design, it will be appreciated that any of a plurality of shapes, and sizes for each optical element of the lens may be provided and function in accordance with the technology/exemplary embodiments discussed herein.

The top and bottom electrodes 310, 340 may comprise a circular design with a plurality of regions. The depicted electrodes 310, 340 may illustrate five separate regions, separated radially, and three concentric circles/rings surrounding a center of the electrodes 310, 340. As discussed herein, the regions of optical lens may be tuned differently, depending, for example, on the desired optical output characteristics, the optical input, lens position, location, and/or the like. In some examples, each of the five radially separated regions/sections, and the three concentric circular regions may be separately controlled to tune optical input differently.

A metal trace may connect to each separate sector, and may allow for each of the regions, e.g., three concentric circles/rings (e.g., circle/region 312) and five radial regions/sections (e.g., region/section 314), to be independently controlled, and thereby independently manipulate the orientation of liquid crystals (e.g., liquid crystals 330). The number of circles/rings and/or regions/sections may vary, depending on the particular application for the lens systems, and/or any dexterity requirements.

In various exemplary embodiments, the electrodes 310, 340 may have high transparency. Indium tin oxide (ITO) may be applicable to many display operations. In various exemplary applications, the electrodes 310, 340 may be formed from at least one of ITO, titanium oxide ($TiO_2$), silver tellurium (AgTe), or silver selenium (AgSe).

Above the bottom electrode 310 is the metasurface 320, comprising structures that may be optimized to focus light from the liquid crystals to a point, region, or area of interest, e.g., another lens, waveguide, etc. The steps on the metasurface layer may also provide a base for locking in the orientation of the liquid crystals (e.g., liquid crystals 330) during the layer formation. The metasurface 320 along with the liquid crystal layer 330, deposited on top of the metasurface 320, forms a lens that may manipulate light from a region of interest to channel the liquid crystal layer 330 and the metasurface 320 towards a waveguide. In various exemplary embodiments, the liquid crystal metasurfaces (e.g., metasurfaces 320) may be comprised of one or more of: diamond, cubic zirconia (CZ), aluminum gallium arsenide (AlGaAs), zinc tellurium (ZnTe), amorphous silicon (a-Si), silicon carbide (SiC), or other engineered materials.

Figure 4:
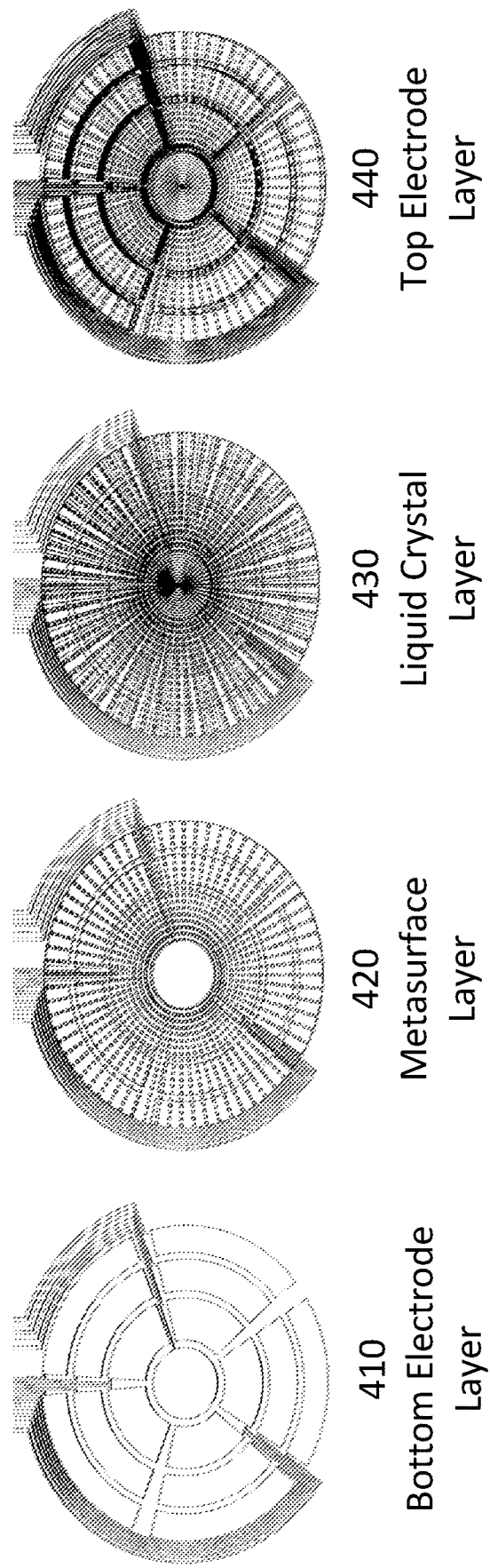
FIG. 4 illustrates an alternate view of optical lens layers, in accordance with exemplary embodiments of the present disclosure.

FIG. 4 illustrates a top view of the optical lens, as each layer is added. The bottom electrode layer 410 (also referred to herein as bottom electrode 410) forms the base for metasurface layer 420. The bottom electrode layer 410 may comprise an optical trace with a plurality of regions that may be individually controlled, as discussed herein (e.g., a plurality of concentric rings, and radially separated sections).

The liquid crystal layer 430 may be deposited on the metasurface layer 420. The top electrode layer 440 (also referred to herein as top electrode 440) may be positioned above the liquid crystal layer 430, such that the pair of electrodes 410, 430 sandwich the metasurface layer 420 and liquid crystal layer 430. The bottom electrode layer 410 and top electrode layer 440 may have a similar configuration and orientation. In other example embodiments, the electrode pairs 410, 430 may have a different configuration and orientation, including but not limited to different region sizes and different tunable areas. The size, shape, and orientation of the electrode pairs 410, 430 may vary based on design considerations, and/or applications of the systems and methods discussed herein.

Figure 5:
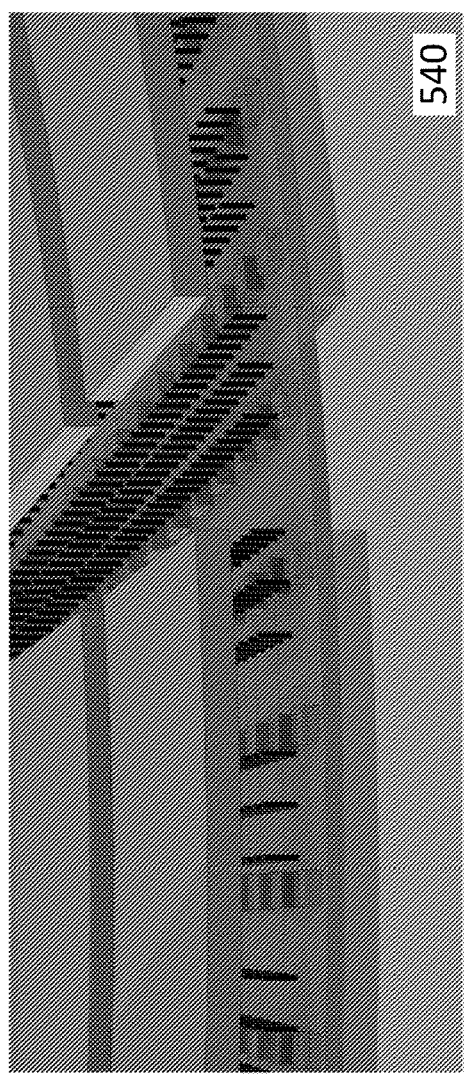
FIG. 5 illustrates a three-dimensional view of optical lens layers, in accordance with exemplary embodiments of the present disclosure.
Figure 5:
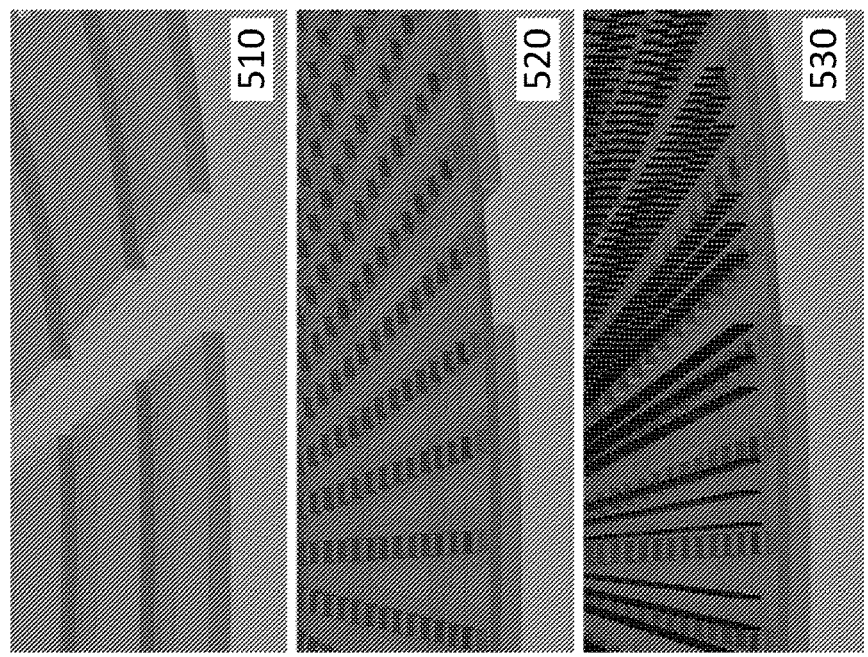

FIG. 5 illustrates a three-dimensional (3-D) view of an optical lens, in accordance with exemplary embodiments. Similar to the layers and views presented in FIG. 4, each 3-D view illustrates the next layer deposited on the lower layer. At box 510, a portion of the bottom electrode (e.g., bottom electrode 410) is illustrated. The electrode's radially separate sections and concentric rings are visible. Each section may be tuned individually, and one or more sections may be tuned together, depending on the desired application.

Box 520 illustrates the metasurface layer provided on the bottom electrode (e.g., bottom electrode 410). As discussed herein, the metasurface (e.g., metasurface layer 420) provides a base for the liquid crystals, which are included in box 530. The orientations of the liquid crystals may be manipulated by one or both electrodes (e.g., electrodes 410, 440). Box 540 illustrates the addition of a top electrode (e.g., top electrode 440), and shows a three-dimensional view of layers that form a lens stack.

Figure 6:
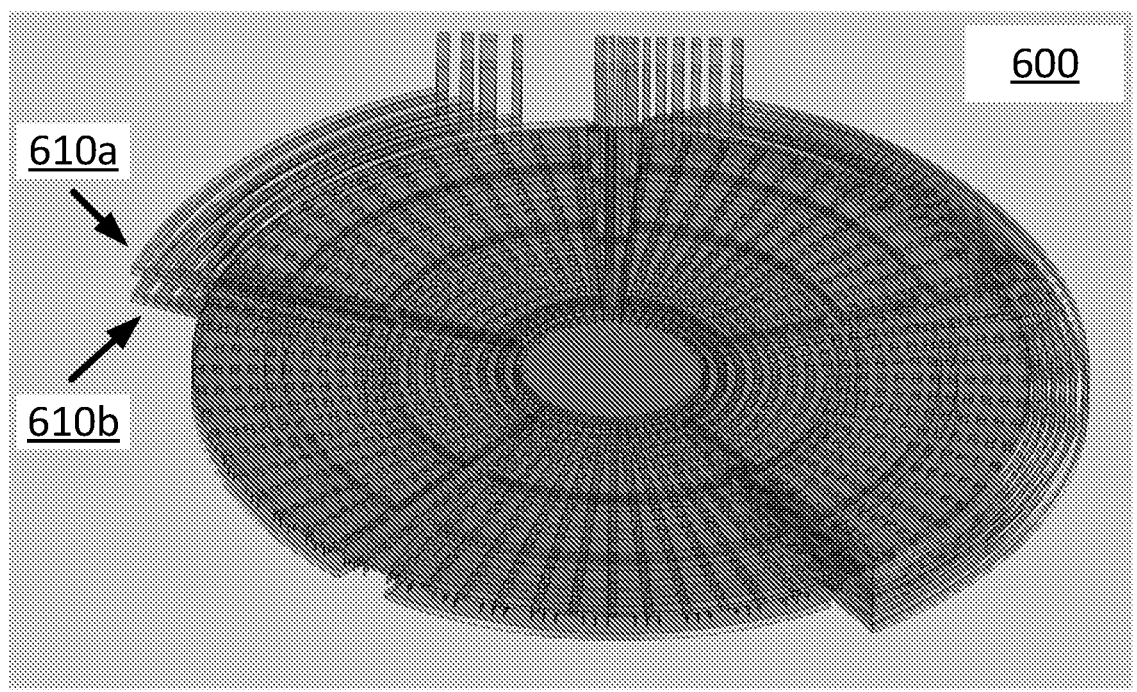
FIG. 6 illustrates an optical lens, in accordance with exemplary embodiments of the present disclosure.
Figure 7:
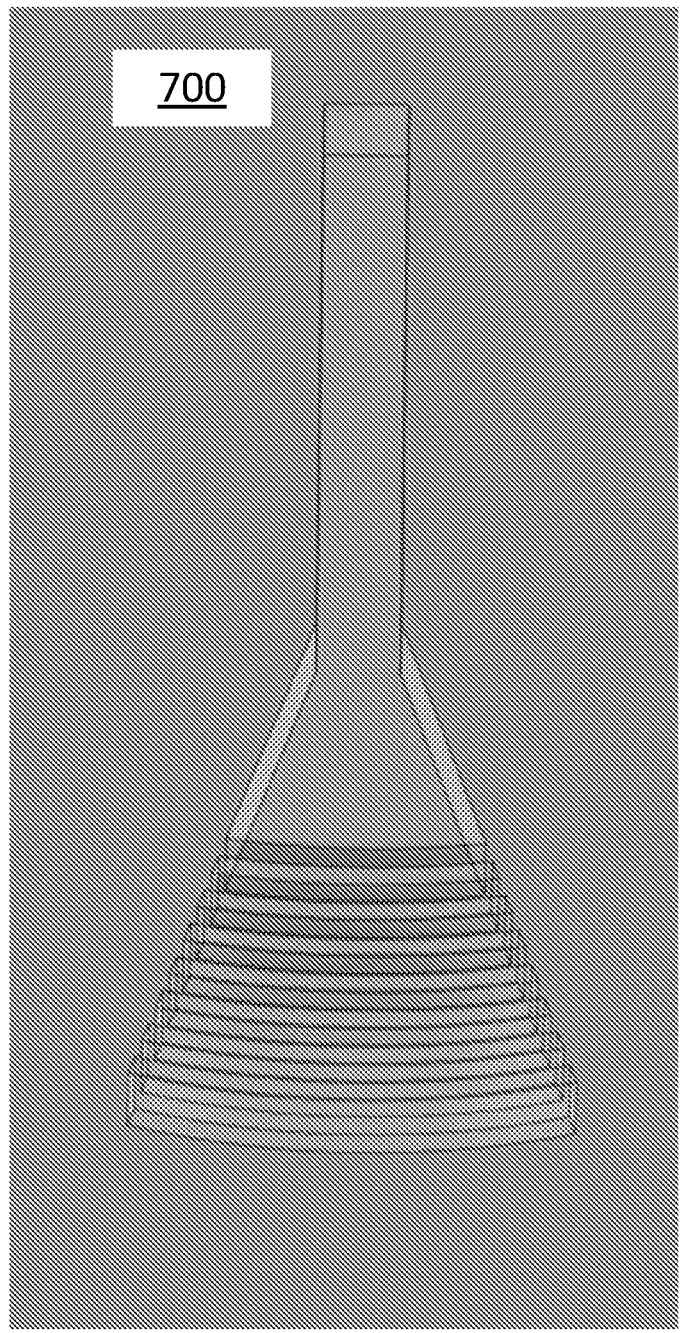
FIG. 7 illustrates a waveguide, in accordance with exemplary embodiments of the present disclosure.
Figure 8:
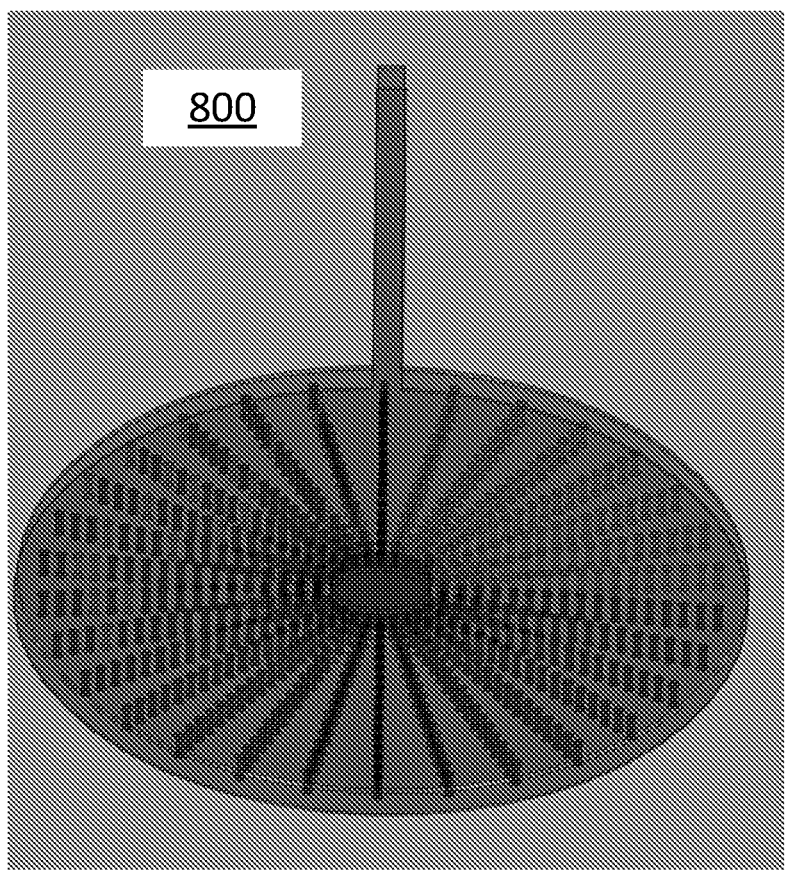
FIG. 8 illustrates a reflector, in accordance with exemplary embodiments of the present disclosure.

FIGS. 6-9 illustrate alternate views of the various lens stack components as discussed herein. FIG. 6 illustrates an optical lens stack 600 comprising a bottom electrode, a metasurface layer, a liquid crystal layer, and a top electrode. The various tunable regions are visible, and may be manipulated by the pair of electrodes 610*a* and 610*b* surrounding the top and bottom surfaces. FIG. 7 illustrates a waveguide grating 700 (also referred to herein as waveguide 700) for receiving optical signals from the optical lens stack, and directing the optical signals, for example, to an image sensor (e.g., image sensor 250). It will be appreciated that the illustrated waveguide 700 is an example, and waveguides usable with various exemplary embodiments herein may take any of a plurality of shapes, forms, and sizes needed to accomplish the waveguide functions, as discussed herein. FIG. 8 illustrates a reflector 800, which may be placed beneath the waveguide (see, e.g., FIG. 1). The reflector 800 may assist in directing optical signals toward the waveguide 700, and otherwise assist in controlling the direction of reflected waves.

Figure 9:
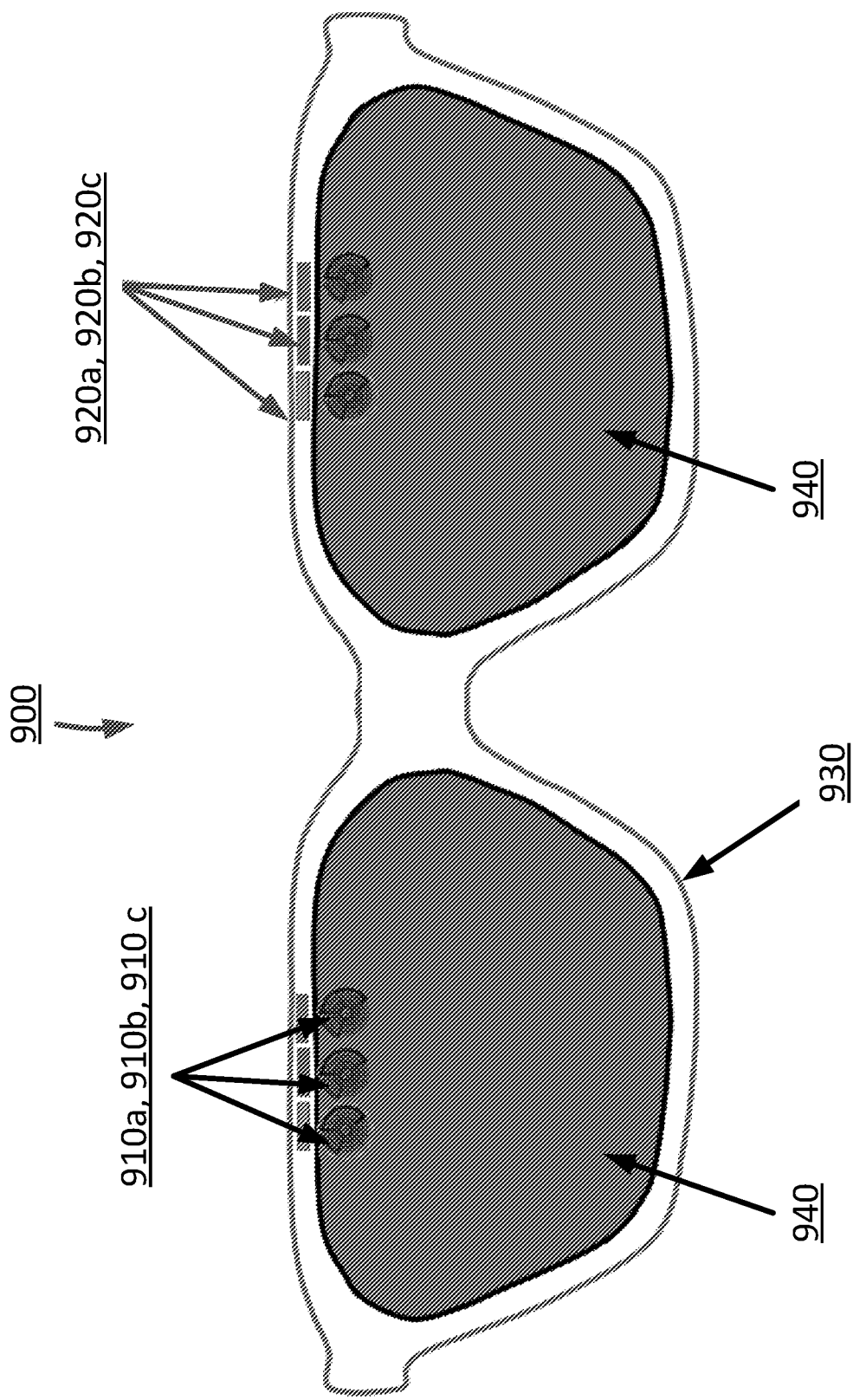
FIG. 9 illustrates a head-mounted optical device, in accordance with exemplary embodiments of the present disclosure.

FIG. 9 illustrates an optical system 900 utilizing the lens systems discussed herein, including a wearable device 930. In various exemplary embodiments, the incorporation of liquid crystal metasurfaces on individual optical elements may be placed on a lens, such as glasses or other eyewear lenses and head-mounted devices.

A plurality of optical lenses 910*a*, 910*b*, and 910*c* may be applied in the optical system 900, and may correspond to respective image sensors 920*a*, 920*b*, 920*c*. The optical lenses 910*a*, 910*b*, 910*c* may also be referred to herein as lens systems 910*a*, 910*b*, 910*c*. In exemplary embodiments, each optical lens may correspond to a wavelength range corresponding to its respective image sensor. For example, optical lenses 910*a*, 910*b*, 910*c*, may correspond to red, green, and blue wavelength ranges. Image sensors 920*a*, 920*b*, and 920*c* may also correspond to red, green, and blue wavelength ranges. In various embodiments, a plurality of optical lenses 910*a*, 910*b*, 910*c*, and image sensors 920*a*, 920*b*, and 920*c* may be embedded in the wearable device 930. For example, the optical lenses may be embedded into and/or form a part of eyepieces 940. The image sensors 920*a*, 920*b*, and 920*c* may be embedded in a frame 930 of the device 930. It will be appreciated that the positioning, proximity, and orientation of the optical lenses and their respective image sensors may vary based on design considerations, available space, the number of required lenses/image sensors, and any of a plurality of considerations.

A plurality of optical lenses and image sensors may be utilized to focus various wavelength ranges into an individual sensor (e.g., image sensor 920*a*). For example, having separate optical lenses and image sensors for red, green, and blue (RGB) wavelengths may allow each image sensor to focus on a particular wavelength/color. Information received at each image sensor may then generate a color image by combining the RGB images captured individually.

Figure 10:
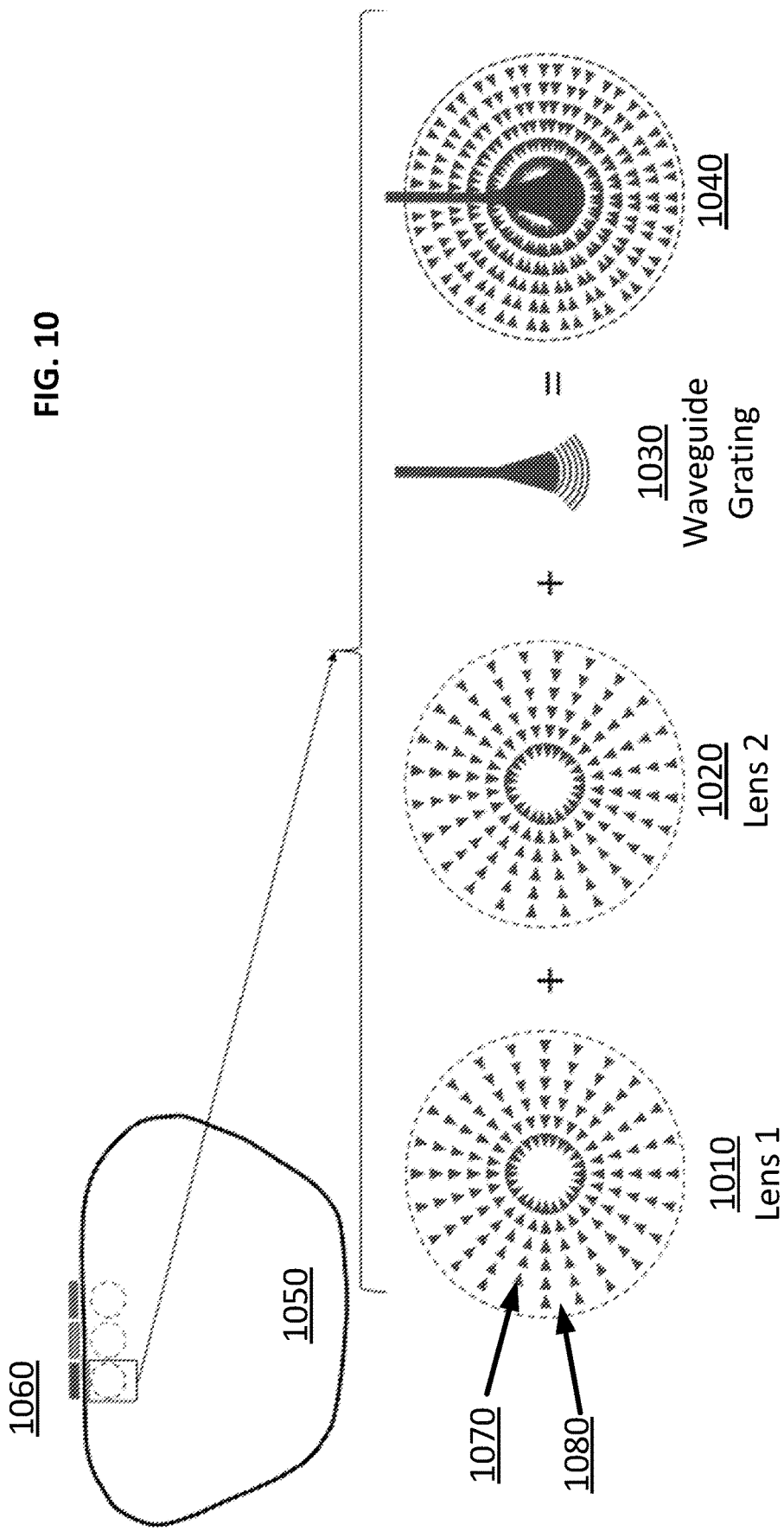
FIG. 10 illustrates a tuning method, in accordance with exemplary embodiments of the present disclosure.

FIG. 10 illustrates a tuning method, using various exemplary embodiments discussed herein. A combination of two optical lenses (Lens 1, 1010 and Lens 2, 1020), each having liquid crystals 1070 deposited on a metasurface 1080, and waveguide grating 1030 form a lens system 1040. The lens system 1040 may receive an optical input and focus a range of wavelengths of the optical input onto the waveguide grating 1030 for transfer of light toward an image sensor 1060. The image sensor 1060 may be positioned on a mount 1050, such as a frame of a head-worn device, e.g., glasses (e.g., AR glasses), or other eyewear piece.

In an exemplary embodiment, the optical lenses 1010, 1020 may be Fresnel lenses, and may provide the ability to zoom in and out to capture a region of interest. In some other exemplary embodiments, the optical lenses 1010, 1020 may be any other suitable lenses. The liquid crystal metasurface of each lens 1010, 1020 may be adaptable, and may be changed, for example, based on the zoom factor of the region of interest. In various examples, the wavelength ranges may correspond to a color range, such as a red, green, or blue color. Multiple lens systems (e.g., lens systems 1040) may be implemented, for example, such that each of the lens systems focuses a different wavelength range to one or more image sensors.

Some examples of colors and wavelength ranges include but are not limited to: Violet: 400-420 nm; Indigo: 420-440 nm; Blue: 440-490 nm; Green: 490-570 nm; Yellow: 570-585 nm; Orange: 585-620 nm; and Red: 620-780 nm. It will be appreciated that any of a plurality of wavelength ranges may be selected based on the application(s) and desired ranges of wavelengths of interest.

In exemplary embodiments, a plurality of image sensors may be used, with one or more dedicated to receiving a specific wavelength range. The one or more image sensors may then be configured to form an image(s), for example, on a display, based on the received optical information.

Figure 11:
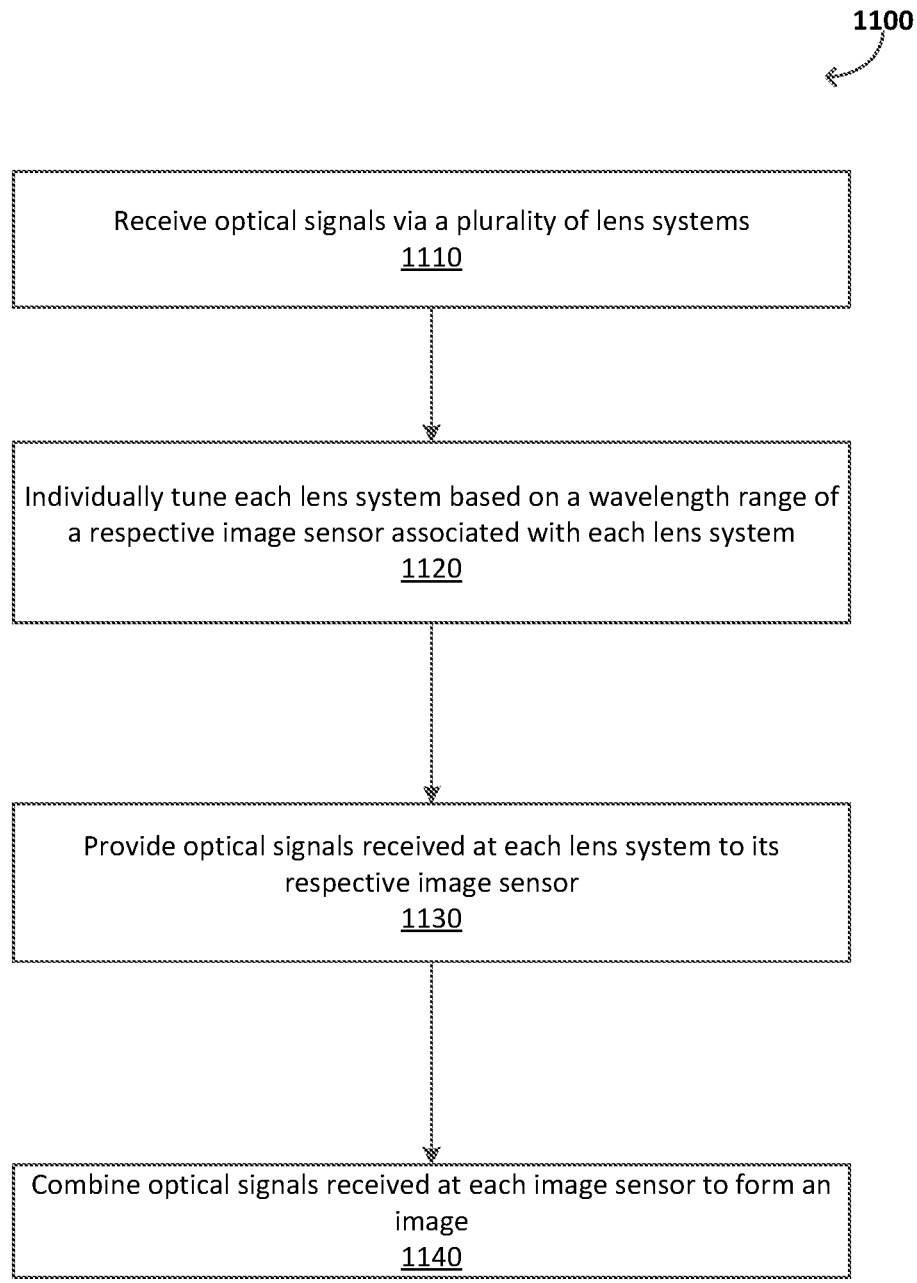
FIG. 11 illustrates an image forming method, in accordance with exemplary embodiments of the present disclosure.

FIG. 11 illustrates a flowchart providing an exemplary image forming method 1100, which may be operable on a computer program product comprising a computer readable medium in accordance with exemplary embodiments discussed herein. At operation 1110, a device (e.g., optical system 900) may receive optical signals via a plurality of lens systems. As discussed herein, the optical signals may comprise light beams, for example, indicative of a scene, provided by another device, or by any of a plurality of optical sources.

At operation 1120, a device (e.g., optical system 900) may individually tune each of the lens systems based on a wavelength range of a respective image sensor associated with each of the lens systems. In exemplary embodiments, the wavelength range may correspond to a color range, such as red, green, and blue wavelength ranges. For example, in the system depicted in FIG. 9, there may be six separate lens systems (e.g., three lens systems 910*a*, 910*b*, 910*c* on each eyepiece 940), and six image sensors (e.g., three image sensors 920*a*, 920*b*, 920*c* on each eyepiece 940). Each lens system (e.g., 910*a*, 910*b*, 910*c*) may correspond to a respective image sensor (e.g., 920*a*, 920*b*, 920*c*) and may be tunable such that each lens system provides a wavelength range corresponding to that of its respective image sensor. In some exemplary embodiments, feedback provided at the image sensor may be used to refine the tuning of each lens system, for example, to focus the received light signals.

At operation 1130, a device (e.g., optical system 900) may receive the optical signals at each of the lens systems and may provide the received optical signals to a respective image sensor. As discussed herein, the image sensor may be a local or remote image sensor and may be in communication with one or more computing devices comprising a processor and a memory. Image sensors may also be mounted, for example, on or inside a frame, e.g., a glasses frame, lens frame, a head-worn device, or other mobile device.

At operation 1140, a device (e.g., optical system 900) may receive optical signals at each image sensor and may combine the received optical signals to form an image. Referring to the example illustrated in FIG. 9, optical signals received at each image sensor 920, may be combined, for example, to form an image on a display. The display may be local or remote. In some examples, the display may be an inner surface or screen on each eyepiece 940. In other examples, the display may be a computing device, such as a mobile computing device, monitor, or other screen or display in communication with the image sensors. In various examples, the image may be compiled and/or displayed in real time, for example, as it is received at the image sensors from a waveguide and optical lenses.

Figure 12:
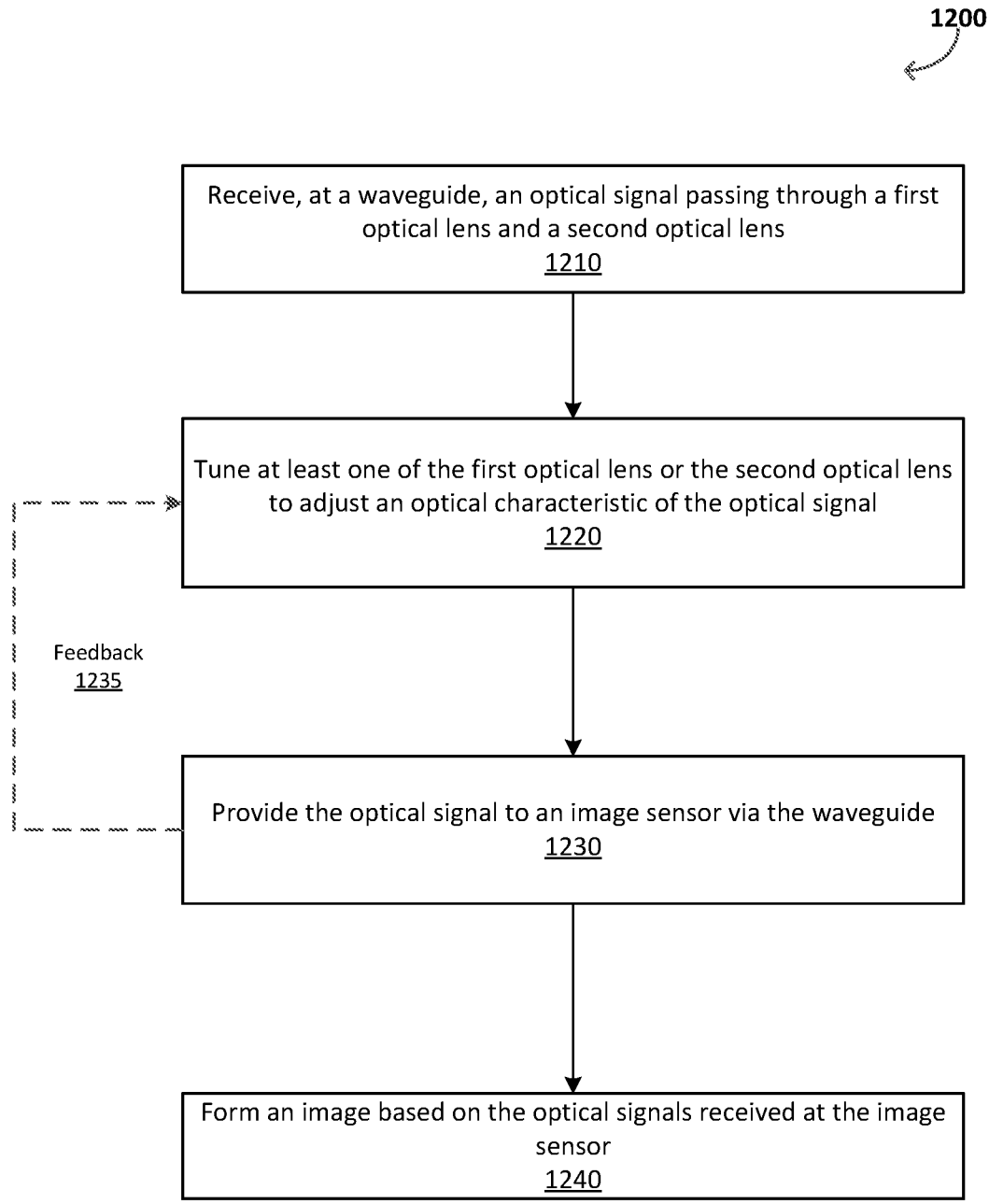
FIG. 12 illustrates another image forming method, in accordance with exemplary embodiments of the present disclosure.

FIG. 12 illustrates another example of an exemplary tuning method 1200, in accordance with the exemplary embodiments discussed herein. In the present example, optical signals may pass through a plurality of lenses (see, e.g., FIG. 2) before reaching an image sensor. The image sensor may optionally provide feedback to assist in tuning one or more lenses to focus, collect, and/or refine signals received at the image sensor.

At operation 1210, a device (e.g., optical system 200) may enable a waveguide to receive an optical signal passing through a first optical lens (e.g., lens 230*a*) and a second optical lens (e.g., lens 230*b*). In some examples, the waveguide may be a waveguide and grating 240. Each optical lens may comprise a liquid crystal metasurface (e.g., metasurface 320) and respective electrodes (e.g., electrodes 220) to manipulate the liquid crystals (e.g., liquid crystals 210), as discussed herein. A first optical lens may have a different transparency and/or translucency than the second optical lens. In various embodiments, the received optical signals may be indicative of a scene. Each optical lens may collect and direct the received optical signals from a same or different area/region of focus and may be directed to a same or different wavelength range. The optical lenses may direct the tuned optical signals toward a waveguide.

At operation 1220, a device (e.g., optical system 200) may tune at least one of the first optical lens and the second optical lens to adjust an optical characteristic of an optical signal. For example, a direction, wavelength, amplitude and/or polarization of the optical signal may be adjusted at one or both of the optical lenses. The adjusted optical characteristic may be tuned via manipulation of the liquid crystals in at least one region on, or associated with, one or both optical lenses. As discussed herein, a pair of electrodes on each optical lens may manipulate the liquid crystals in one or more sections (e.g., section 314) of each optical lens.

At operation 1230, a device (e.g., optical system 200) may provide the optical signal to an image sensor (e.g., image sensor 250) via the waveguide (e.g., waveguide and grating 240). In some exemplary embodiments, the image sensor may be local or remote. Optionally, a device (e.g., optical system 200) may facilitate feedback 1235 provided by the image sensor (e.g., image sensor 250) to fine tune and adjust the liquid crystal orientations on at least one of the optical lenses (e.g., lens 230*a*, 230*b*), for example, to focus and/or refine one or more optical characteristics, for example, direction, amplitude, phase, and polarization. In some embodiments at least one of the first optical lens and the second optical lens may be tuned based on feedback provided by the image sensor.

At operation 1240, a device (e.g., optical system 200) may enable an image to be formed/generated, by the image sensor, based on the optical signals received at the image sensor. In embodiments, the image may be formed/generated on a display. In other embodiments, the optical signals may produce image information usable for one or more operations, depending on desired operations and applications. At least one of the first optical lenses and the second optical lenses may also be tuned based on a wavelength range of the image sensor.

Figure 13:
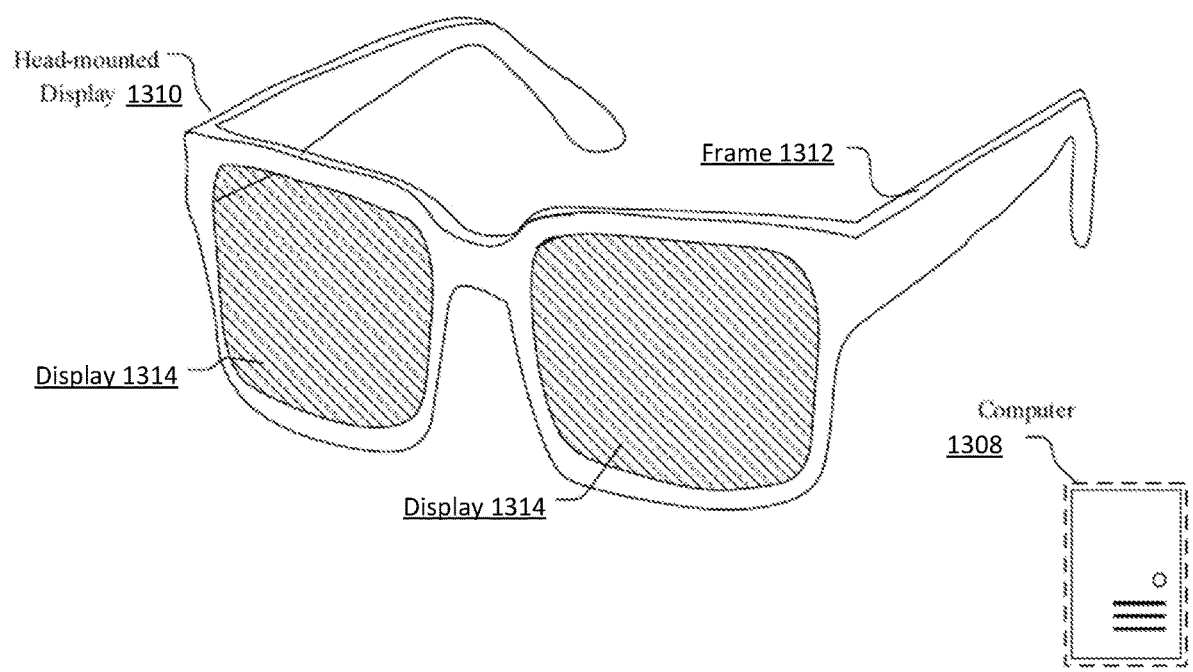
FIG. 13 illustrates an artificial reality system comprising a headset, in accordance with exemplary embodiments of the present disclosure.

FIG. 13 illustrates an example display system 1300 (e.g., optical system 900) in accordance with embodiments. The display system 1300 may include a head-mounted display (HMD) 1310 (e.g., wearable device 930) (e.g., glasses) comprising a frame 1312 (e.g., frame 930), one or more displays 1314 (e.g., eyepieces 940), and a computing device 1308 (also referred to herein as computer 1308). The displays 1314 may be transparent or translucent allowing a user wearing the HMD 1310 to look through the displays 1314 to see the real world and/or visual artificial reality content. The HMD 1310 may include an audio device (e.g., speaker/microphone 38 of FIG. 11) that may provide audio content to users. The HMD 1310 may include one or more cameras, as discussed herein, which may capture images and videos of environments. The HMD 1310 may include an eye tracking system to track the vergence movement of the user wearing the HMD 1310. In one example embodiment, the camera may be the eye tracking system. The HMD 1310 may include a microphone of the audio device to capture voice input from the user. The display system 1300 may further include a controller (e.g., processor 32 of FIG. 14) comprising a trackpad and one or more buttons. The controller may receive inputs from users and relay the inputs to the computing device 1308. The controller may also provide haptic feedback to users. The computing device 1308 may be connected to the HMD 1310 and the controller through cables or wireless connections. The computing device 1308 may control the HMD 1310 and the controller to provide content to and receive inputs from one or more users. In some example embodiments, the controller may be a standalone controller or integrated within the HMD 1310. The computing device 1308 may be a standalone host computer device, an on-board computer device integrated with the HMD 1310, a mobile device, or any other hardware platform capable of providing artificial reality content to and receiving inputs from users. In some exemplary embodiments, HMD 1310 may include an artificial reality system/virtual reality system.

Figure 14:
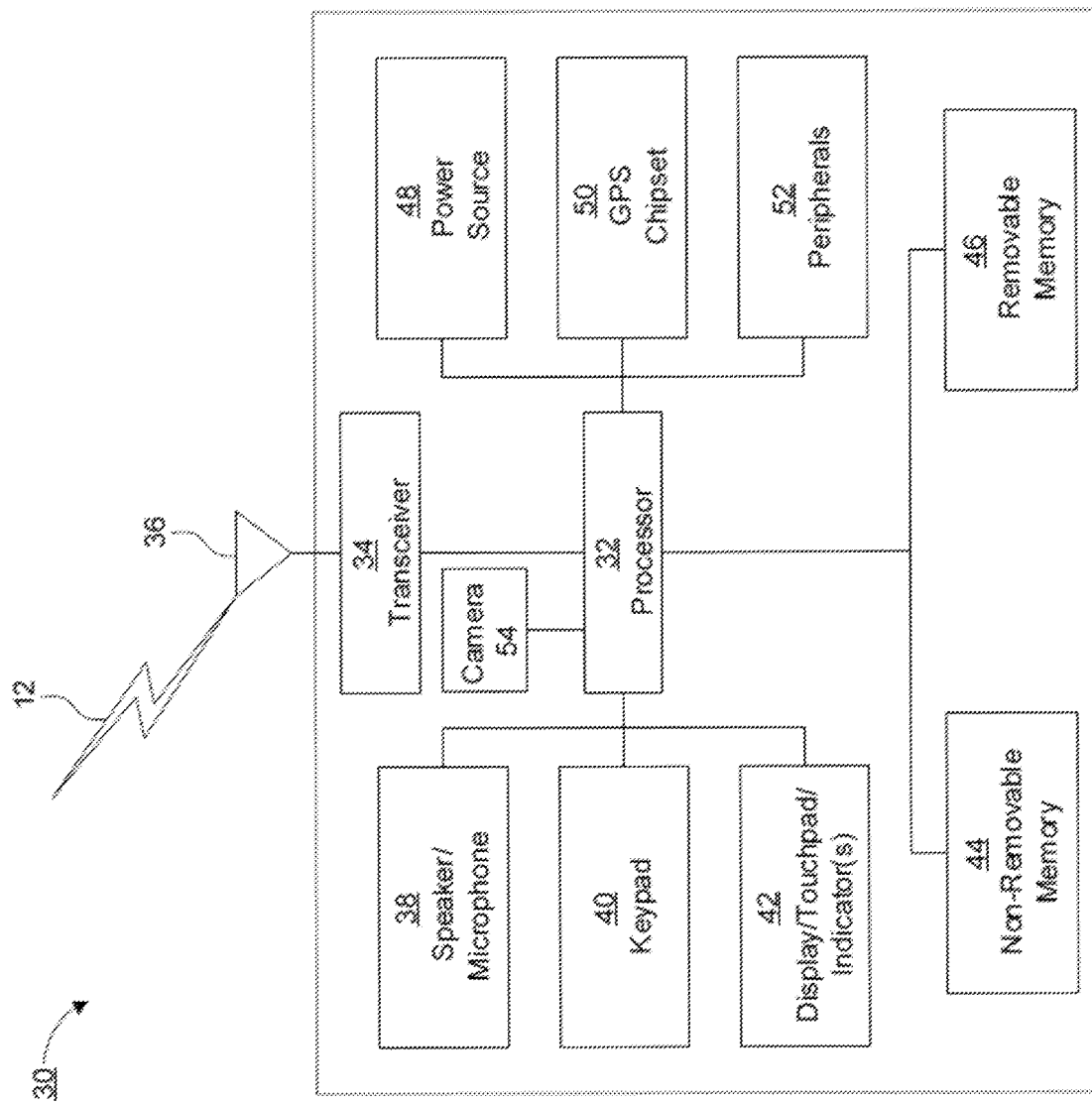
FIG. 14 illustrates a block diagram of an example device according to an exemplary embodiment of the present disclosure.

FIG. 14 illustrates a block diagram of an exemplary hardware/software architecture of a UE 30. As shown in FIG. 14, the UE 30 (also referred to herein as node 30) may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The UE 30 may also include a camera 54 (e.g., image sensor 250, image sensors 920a, 920b, 920c, image sensor 1060)). In an exemplary embodiment, the camera 54 is a smart camera configured to sense images appearing within one or more bounding boxes. The UE 30 may also include communication circuitry, such as a transceiver 34 and a transmit/receive element 36. It will be appreciated the UE 30 may include any sub-combination of the foregoing elements while remaining consistent with an embodiment.

The processor 32 may be a special purpose processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node 30 in order to perform the various required functions of the node. For example, the processor 32 may perform signal coding, data processing, power control, input/output processing, and/or any other functionality that enables the node 30 to operate in a wireless or wired environment. The processor 32 may run application-layer programs (e.g., browsers) and/or radio access-layer (RAN) programs and/or other communications programs. The processor 32 may also perform security operations such as authentication, security key agreement, and/or cryptographic operations, such as at the access-layer and/or application layer for example.

The processor 32 is coupled to its communication circuitry (e.g., transceiver 34 and transmit/receive element 36). The processor 32, through the execution of computer executable instructions, may control the communication circuitry in order to cause the node 30 to communicate with other nodes via the network to which it is connected.

The transmit/receive element 36 may be configured to transmit signals to, or receive signals from, other nodes or networking equipment via network 12. For example, in an embodiment, the transmit/receive element 36 may be an antenna configured to transmit and/or receive radio frequency (RF) signals. The transmit/receive element 36 may support various networks and air interfaces, such as wireless local area network (WLAN), wireless personal area network (WPAN), cellular, and the like. In yet another embodiment, the transmit/receive element 36 may be configured to transmit and receive both RF and light signals. It will be appreciated that the transmit/receive element 36 may be configured to transmit and/or receive any combination of wireless or wired signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple radio access technologies (RATs), such as universal terrestrial radio access (UTRA) and Institute of Electrical and Electronics Engineers (IEEE 802.11), for example.

The processor 32 may access information from, and store data in, any type of suitable memory, such as the non-removable memory 44 and/or the removable memory 46. For example, the processor 32 may store session context in its memory, as described above. The non-removable memory 44 may include RAM, ROM, a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which may be configured to provide location information (e.g., longitude and latitude) regarding the current location of the node 30. It will be appreciated that the node 30 may acquire location information by way of any suitable location-determination method while remaining consistent with an exemplary embodiment.

Figure 15:
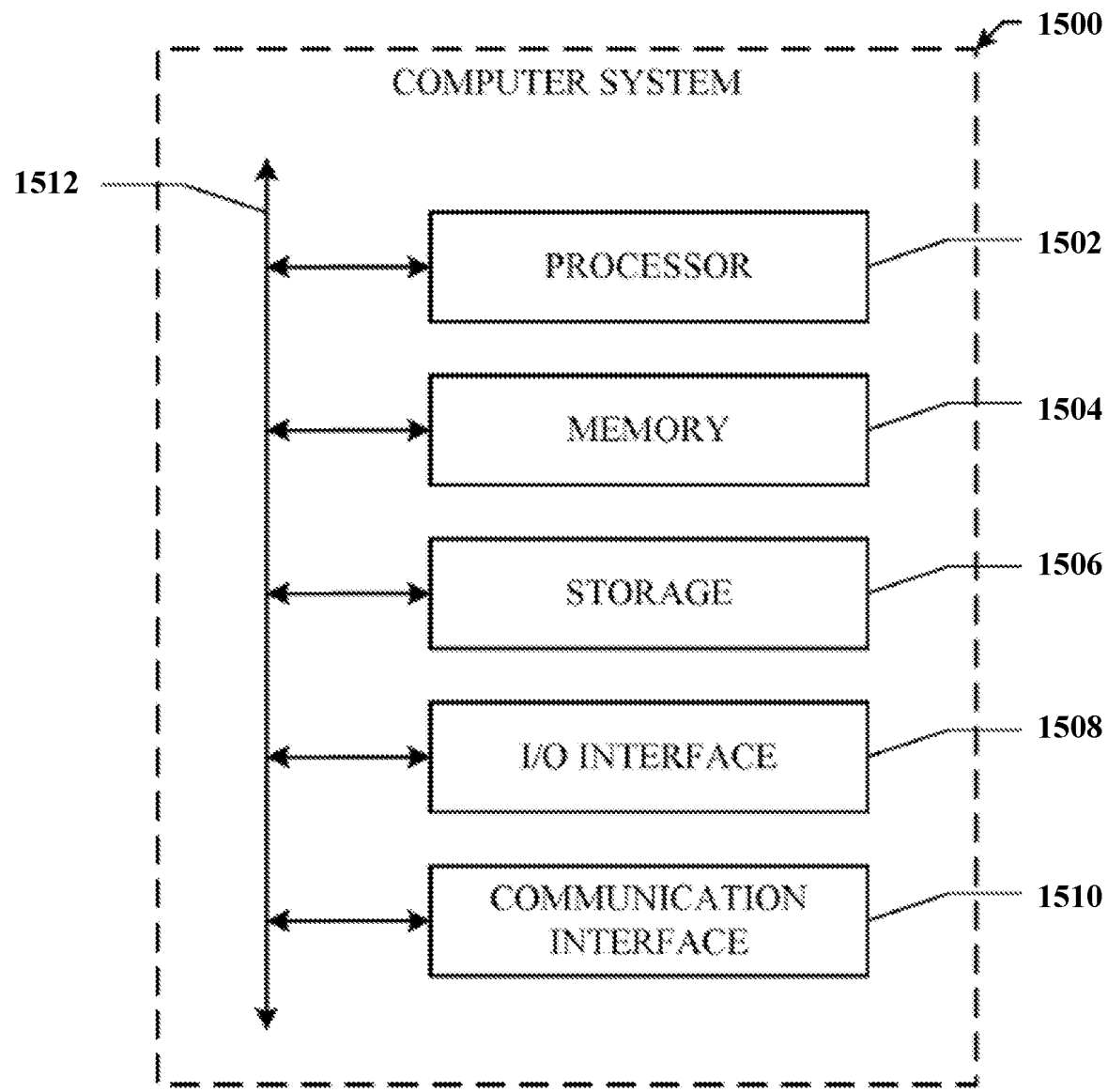
FIG. 15 illustrates a computing system in accordance with exemplary embodiments of the present disclosure.

FIG. 15 illustrates an example computer system 1500. In exemplary embodiments, one or more computer systems 1500 perform one or more steps of one or more methods described or illustrated herein. In particular embodiments, one or more computer systems 1500 provide functionality described or illustrated herein. In exemplary embodiments, software running on one or more computer systems 1500 performs one or more steps of one or more methods described or illustrated herein or provides functionality described or illustrated herein. Exemplary embodiments include one or more portions of one or more computer systems 1500. Herein, reference to a computer system may encompass a computing device, and vice versa, where appropriate. Moreover, reference to a computer system may encompass one or more computer systems, where appropriate.

This disclosure contemplates any suitable number of computer systems 1500. This disclosure contemplates computer system 1500 taking any suitable physical form. As example and not by way of limitation, computer system 1500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1500 may include one or more computer systems 1500; be unitary or distributed; span multiple locations; span multiple machines; span multiple data centers; or reside in a cloud, which may include one or more cloud components in one or more networks. Where appropriate, one or more computer systems 1500 may perform without substantial spatial or temporal limitation one or more steps of one or more methods described or illustrated herein. As an example, and not by way of limitation, one or more computer systems 1500 may perform in real time or in batch mode one or more steps of one or more methods described or illustrated herein. One or more computer systems 1500 may perform at different times or at different locations one or more steps of one or more methods described or illustrated herein, where appropriate.

In exemplary embodiments, computer system 1500 includes a processor 1502, memory 1504, storage 1506, an input/output (I/O) interface 1508, a communication interface 1510, and a bus 1512. Although this disclosure describes and illustrates a particular computer system having a particular number of particular components in a particular arrangement, this disclosure contemplates any suitable computer system having any suitable number of any suitable components in any suitable arrangement.

In exemplary embodiments, processor 1502 includes hardware for executing instructions, such as those making up a computer program. As an example, and not by way of limitation, to execute instructions, processor 1502 may retrieve (or fetch) the instructions from an internal register, an internal cache, memory 1504, or storage 1506; decode and execute them; and then write one or more results to an internal register, an internal cache, memory 1504, or storage 1506. In particular embodiments, processor 1502 may include one or more internal caches for data, instructions, or addresses. This disclosure contemplates processor 1502 including any suitable number of any suitable internal caches, where appropriate. As an example and not by way of limitation, processor 1502 may include one or more instruction caches, one or more data caches, and one or more translation lookaside buffers (TLBs). Instructions in the instruction caches may be copies of instructions in memory 1504 or storage 1506, and the instruction caches may speed up retrieval of those instructions by processor 1502. Data in the data caches may be copies of data in memory 1504 or storage 1506 for instructions executing at processor 1502 to operate on; the results of previous instructions executed at processor 1502 for access by subsequent instructions executing at processor 1502 or for writing to memory 1504 or storage 1506; or other suitable data. The data caches may speed up read or write operations by processor 1502. The TLBs may speed up virtual-address translation for processor 1502. In particular embodiments, processor 1502 may include one or more internal registers for data, instructions, or addresses. This disclosure contemplates processor 1502 including any suitable number of any suitable internal registers, where appropriate. Where appropriate, processor 1502 may include one or more arithmetic logic units (ALUs); be a multi-core processor; or include one or more processors 1502. Although this disclosure describes and illustrates a particular processor, this disclosure contemplates any suitable processor.

In exemplary embodiments, memory 1504 includes main memory for storing instructions for processor 1502 to execute or data for processor 1502 to operate on. As an example and not by way of limitation, computer system 1500 may load instructions from storage 1506 or another source (such as, for example, another computer system 1500) to memory 1504. Processor 1502 may then load the instructions from memory 1504 to an internal register or internal cache. To execute the instructions, processor 1502 may retrieve the instructions from the internal register or internal cache and decode them. During or after execution of the instructions, processor 1502 may write one or more results (which may be intermediate or final results) to the internal register or internal cache. Processor 1502 may then write one or more of those results to memory 1504. In particular embodiments, processor 1502 executes only instructions in one or more internal registers or internal caches or in memory 1504 (as opposed to storage 1506 or elsewhere) and operates only on data in one or more internal registers or internal caches or in memory 1504 (as opposed to storage 1506 or elsewhere). One or more memory buses (which may each include an address bus and a data bus) may couple processor 1502 to memory 1504. Bus 1512 may include one or more memory buses, as described below. In exemplary embodiments, one or more memory management units (MMUs) reside between processor 1502 and memory 1504 and facilitate accesses to memory 1504 requested by processor 1502. In particular embodiments, memory 1504 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1504 may include one or more memories 1504, where appropriate. Although this disclosure describes and illustrates particular memory, this disclosure contemplates any suitable memory.

In exemplary embodiments, storage 1506 includes mass storage for data or instructions. As an example, and not by way of limitation, storage 1506 may include a hard disk drive (HDD), a floppy disk drive, flash memory, an optical disc, a magneto-optical disc, magnetic tape, or a Universal Serial Bus (USB) drive or a combination of two or more of these. Storage 1506 may include removable or non-removable (or fixed) media, where appropriate. Storage 1506 may be internal or external to computer system 1500, where appropriate. In exemplary embodiments, storage 1506 is non-volatile, solid-state memory. In particular embodiments, storage 1506 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1506 taking any suitable physical form. Storage 1506 may include one or more storage control units facilitating communication between processor 1502 and storage 1506, where appropriate. Where appropriate, storage 1506 may include one or more storages 1506. Although this disclosure describes and illustrates particular storage, this disclosure contemplates any suitable storage.

In exemplary embodiments, I/O interface 1508 includes hardware, software, or both, providing one or more interfaces for communication between computer system 1500 and one or more I/O devices. Computer system 1500 may include one or more of these I/O devices, where appropriate. One or more of these I/O devices may enable communication between a person and computer system 1500. As an example, and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1508 for them. Where appropriate, I/O interface 1508 may include one or more device or software drivers enabling processor 1502 to drive one or more of these I/O devices. I/O interface 1508 may include one or more I/O interfaces 1508, where appropriate. Although this disclosure describes and illustrates a particular I/O interface, this disclosure contemplates any suitable I/O interface.

In exemplary embodiments, communication interface 1510 includes hardware, software, or both providing one or more interfaces for communication (such as, for example, packet-based communication) between computer system 1500 and one or more other computer systems 1500 or one or more networks. As an example, and not by way of limitation, communication interface 1510 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1510 for it. As an example, and not by way of limitation, computer system 1500 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1500 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1500 may include any suitable communication interface 1510 for any of these networks, where appropriate. Communication interface 1510 may include one or more communication interfaces 1510, where appropriate. Although this disclosure describes and illustrates a particular communication interface, this disclosure contemplates any suitable communication interface.

In particular embodiments, bus 1512 includes hardware, software, or both coupling components of computer system 1500 to each other. As an example and not by way of limitation, bus 1512 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1512 may include one or more buses 1512, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

The foregoing description of the embodiments has been presented for the purpose of illustration; it is not intended to be exhaustive or to limit the patent rights to the precise forms disclosed. Persons skilled in the relevant art may appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof Any of the steps, operations, or processes described herein may be performed or implemented with one or more hardware or software modules, alone or in combination with other devices. In one embodiment, a software module is implemented with a computer program product comprising a computer-readable medium containing computer program code, which may be executed by a computer processor for performing any or all of the steps, operations, or processes described.

Embodiments also may relate to an apparatus for performing the operations herein. This apparatus may be specially constructed for the required purposes, or it may comprise a computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments also may relate to a product that is produced by a computing process described herein. Such a product may comprise information resulting from a computing process, where the information is stored on a non-transitory, tangible computer readable storage medium and may include any embodiment of a computer program product or other data combination described herein.

The language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed:

1. A device comprising:
   a first optical lens;
   a liquid crystal metasurface formed on the first optical lens;
   a waveguide configured to receive an optical signal passing through the first optical lens;
   a pair of electrodes positioned on opposite sides of the first optical lens, the pair of electrodes configured to tune sections of the liquid crystal metasurface and adjust an optical characteristic of the optical signal; and
   a liquid crystal reflector configured to direct the optical signal to the waveguide.

2. The device of claim 1, wherein the optical characteristic comprises at least one of direction, amplitude, phase, or polarization.

3. The device of claim 1, further comprising an image sensor configured to receive the optical signal from the waveguide and generate an image.

4. The device of claim 3, wherein the pair of electrodes are configured to tune the liquid crystal metasurface to focus the optical signal within a wavelength range of the image sensor.

5. The device of claim 1, wherein the pair of electrodes are configured to simultaneously tune a plurality of sections of the liquid crystal metasurface.

6. The device of claim 1, wherein the first optical lens comprises an optical lens associated with a Fresnel lens.

7. The device of claim 1, wherein the device comprises a lens system comprising a thickness of 10-15 micrometers.

8. The device of claim 1, wherein the liquid crystal metasurface comprises one or more of diamond, cubic zirconia (CZ), aluminum gallium arsenide (AlGaAs), zinc tellurium (ZnTe), amorphous silicon (a-Si), or silicon carbide (SiC).

9. The device of claim 1, wherein the pair of electrodes comprise at least one of indium tin oxide (ITO), titanium oxide ($TiO_2$), silver tellurium (AgTe), or silver selenium (AgSe).

10. The device of claim 1, further comprising:
    a second optical lens positioned between the first optical lens and the waveguide, the second optical lens comprising a second liquid crystal metasurface tunable by a second pair of electrodes positioned on opposite sides of the second optical lens.

11. The device of claim 10, wherein the first optical lens and the second optical lens comprise different transparencies.

12. The device of claim 1, wherein the device comprises a head-mounted device.

13. A method comprising:
    receiving, at a waveguide, an optical signal passing through a first optical lens and a second optical lens, wherein the first optical lens and the second optical lens comprise a liquid crystal metasurface and a pair of electrodes positioned on opposite sides of the first optical lens, and wherein the pair of electrodes are configured to tune sections of the liquid crystal metasurface;
    tuning at least one of the first optical lens or the second optical lens to adjust an optical characteristic of the optical signal;
    providing the optical signal to an image sensor via the waveguide; and
    generating an image based on the optical signal received at the image sensor.

14. The method of claim 13, further comprising:
    tuning at least one of the first optical lens or the second optical lens based on feedback provided by the image sensor.

15. The method of claim 13, further comprising:
    tuning at least one of the first optical lens or the second optical lens based on a wavelength range of the image sensor.

16. The method of claim 13, wherein the optical characteristic comprises at least one of direction, amplitude, phase, or polarization.

* * * * *